United States Patent [19]
Jennings

[11] 3,934,802
[45] Jan. 27, 1976

[54] TUBE CLAMPING FASTENER
[75] Inventor: Ralph Ernest Jennings, Glen Ellyn, Ill.
[73] Assignee: Illinois Tool Works Inc., Chicago, Ill.
[22] Filed: Nov. 4, 1974
[21] Appl. No.: 520,511

[52] U.S. Cl. .................. 248/71; 85/28; 174/159; 248/216
[51] Int. Cl.² .......................... F16B 15/00
[58] Field of Search .......... 248/49, 68 R, 71, 205 R, 248/216, 217; 174/159, 164; 85/28, 49

[56] References Cited
UNITED STATES PATENTS

| 271,825 | 2/1883 | Fiske | 248/71 |
|---|---|---|---|
| 525,088 | 8/1894 | Belding | 248/71 |
| 662,587 | 11/1900 | Blake | 248/71 X |
| 751,354 | 2/1904 | Smart | 248/71 X |
| 1,099,320 | 6/1914 | Southgate | 174/159 |
| 1,695,155 | 12/1928 | Parker | 174/159 |
| 1,841,353 | 1/1932 | Boggess | 85/49 |
| 2,309,261 | 1/1943 | Tallman | 248/71 |
| 2,542,442 | 2/1951 | Weber | 248/68 R |
| 3,582,031 | 6/1971 | Scott | 248/71 |

FOREIGN PATENTS OR APPLICATIONS

| 48,734 | 12/1930 | Norway | 174/59 |
|---|---|---|---|
| 593,860 | 3/1934 | Germany | 85/49 |
| 907,141 | 2/1954 | Germany | 248/71 |

Primary Examiner—Roy D. Frazier
Assistant Examiner—Lawrence J. Staab
Attorney, Agent, or Firm—T. W. Buckman; R. W. Beart

[57] ABSTRACT

A self-penetrating fastener for clamping and retaining tubing or the like to a support surface in spaced relationship thereto. A pin member is formed with a recess beneath the head and adjacent the shank of the pin. A flexible channel shaped liner is carried on the shank so that the liner is forced upwardly of the shank, responsive to the driving of the fastener, into and following the contour of the recess to diminish the throat dimension of the recess and substantially surround the tubing received and clamped therein with a single driving impact from a tool.

15 Claims, 11 Drawing Figures

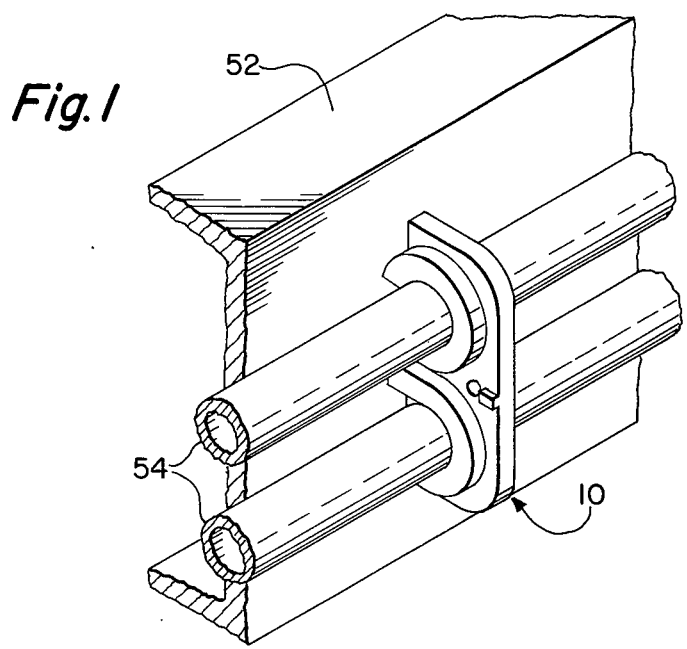
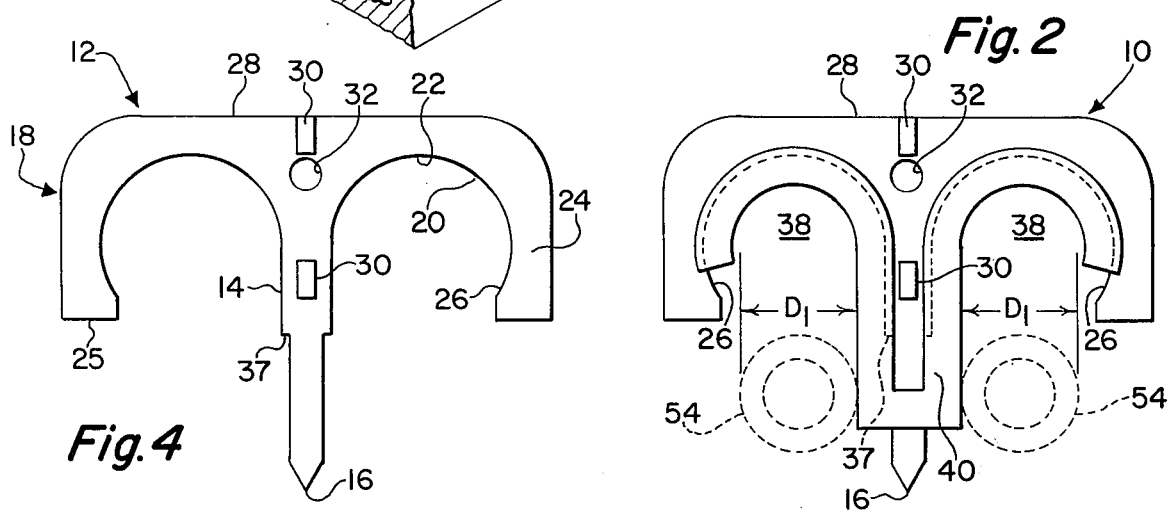
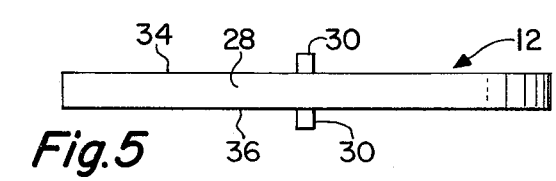
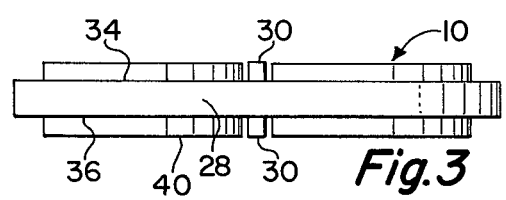
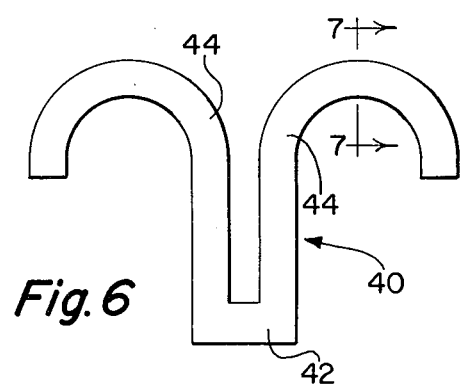
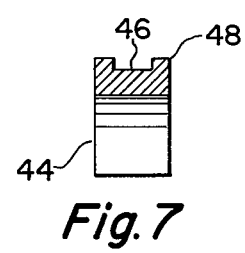

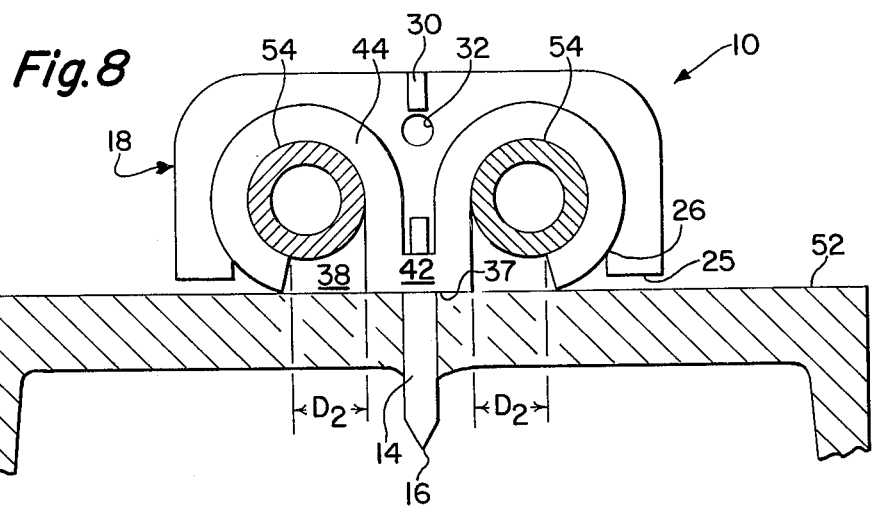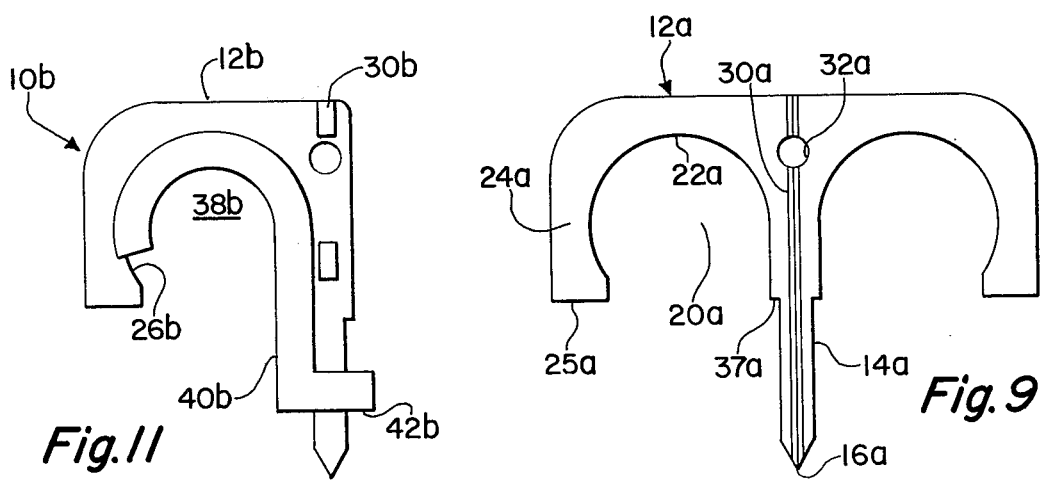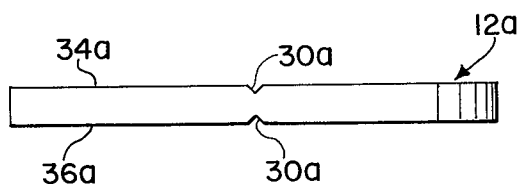

TUBE CLAMPING FASTENER

BACKGROUND OF THE INVENTION

The present invention relates generally to a novel device for securing elongated workpieces, such as tubing or the like, to a support and more specifically to a device for clamping tubing in spaced relationship to the support surface with a fastener without the requirement that a hole be preformed in the support surface.

Certain prior art devices currently utilized to attach tubing to a support surface, such as the attachment brake or fuel line tubing to the chassis of an automobile, are basically sheet metal members which include a shank and a spring clip portion. The shank is adapted to be inserted in a preformed hole in the support surface so that the tubing may subsequently be snapped into the spring clip portion. This device has the apparent disadvantage of requiring holes to be formed in the support structure. In addition to this disadvantage the snap-in spring clip retention for the tubing may not provide the positive firm clamping necessary to eliminate vibrations, rubbing, etc. To remedy this, the prior art has utilized a spring clip device with an additional fastener member, such as a screw, designed to clamp the spring members together. Obviously, this will require an additional hole in the support surface as well as an additional step in securing the tubing to the support.

SUMMARY OF THE INVENTION

It is an object of the present invention to provide a fastening device which is capable of clamping elongated workpieces, such as tubing, to a support surface without preparing the support surface with apertures.

It is a further object of the invention to provide a clamping device which enables tubing to be secured to a support surface in a spaced relationship thereto and further to be supported in such a manner as to cushion the tubing thus preventing the harmful results of vibrations, rubbing or the like of the tubing on the support surface.

One of the advantages of the present invention is that it provides the capability to drive a fastener having a recess beneath the head over tubing in such a manner as to diminish the throat of the recess after the tubing has been received therein to prohibit substantial contact of the tubing with the support surface and provide a protective liner about the tubing.

The above and other objects and advantages are accomplished with the fastener device of the invention which includes a pin member having a shank with a substantially sharp point at one extremity and a head portion having tubing receiving recesses on the undersurface thereof located at the other extremity. A flexible, channel-shaped liner is preassembled on the shank of the fastener in such a manner as to be driven or forced upwardly along the shank into and following the contour of the recess as the pin is driven into a support surface. The surface forming the periphery of the recess includes a continuation of the shank surface and the outermost extremity of the recess periphery is preferably directed inwardly toward the shank. Such a device will permit tubing to be positioned on a support surface so that as the fastener is driven into the support surface the liner is forced around at least partially surrounding the tubing, firmly clamping and cushioning the tubing relative to the support surface while at the same time spacing the tubing from the support surface as a result of the liner being guided to a position beneath the tubing by the inwardly directed segments of the recess.

BRIEF DESCRIPTION OF THE DRAWINGS

FIG. 1 is a perspective view showing the fastener device as it is utilized to secure tubing to a support surface.

FIG. 2 is a front elevation view of the composite fastener device showing, in dotted lines, tubing which will be positioned beneath the recesses of the device.

FIG. 3 is a top plan view of the fastening device shown in FIG. 2.

FIG. 4 is a front elevation view of the pin member of the fastening device.

FIG. 5 is a top plan view of the pin member shown in FIG. 4.

FIG. 6 is a front view of the flexible liner which is used in association with the pin member to provide the composite fastener device of the invention.

FIG. 7 is a sectional view of the flexible liner taken along lines 7—7 of FIG. 6.

FIG. 8 is a partial sectional view showing the composite fastening device driven through a support surface and clamping the tubing thereto.

FIG. 9 is an alternate embodiment of the pin member of the present invention.

FIG. 10 is a top plan view of the pin member shown in FIG. 9.

FIG. 11 is a front elevational view of an alternate embodiment of a composite fastening device showing a single tubing receiving recess.

DESCRIPTION OF THE PREFERRED EMBODIMENTS

Referring now in detail to the drawings wherein like numerals have been employed to designate similar parts throughout the various figures, it will be seen that one embodiment contemplated by the present invention is disclosed in FIGS. 1-8 and is designated generally by the numeral 10. The fastening device 10 is adapted to secure elongated tubing or pipes 54 to a work support surface 52. The fastening device 10 is particularly useful in the attachment of tubing or piping to a beam, engine block or any other desired part in a motor vehicle or other structure in which tubing is to be secured. An example of such an installation utilizing the invention is shown in FIG. 1. The composite device 10, will include a pin member 12 having a head portion 18, a shank portion 14 and a substantially sharp penetrating point 16 with a flesible strip 40 preassembled along the shank.

The pin member will be substantially uniform in thickness from one extremity to the other and will be configured to provide at least one recess 20 on the undersurface of the head. Such a recess, as shown in FIG. 4, will substantially be a curvilinear surface extending from the shank and formed primarily by a bight portion 22 extending laterally from the shank interconnecting a leg portion 24 which extends generally in the same direction as the shank but which terminates with surfaces 25 disposed upwardly from the penetrating point of the shank. The peripheral surface of the recess may be defined as including a pair of opposing side wall portions and a top wall portion. The top wall portion will be the undersurface of the bight while the side wall portions are formed from a continuation of a side surface of the shank and the inner surface of the leg 24. The side wall portion of the recess formed by the surface of the leg will include a segment 26 adjacent the extremity 25 which is directed inwardly toward the shank for a purpose to be described later herein.

The flexible liner member 40, which is an element of the composite fastening device 10, will preferably be constructed of a thermoplastic material and is preferably channel-shaped in cross-sectional configuration as shown in FIG. 7. The transverse portion 46 of the cross-sectional configuration of the liner should be substantially equal to the thickness of the pin member so that the leg portions 48 will lie on either side of the pin member when the liner has been assembled on the pin member as shown in FIGS. 2 and 3. In the preferred embodiment the liner will be a one-piece strip having a bight or base portion 42 interconnecting a pair of sections adapted to extend longitudinally of the shank and into the recess of the fastener.

Attention is directed to FIG. 2 showing the liner 40 assembled on the pin member 12 so that the longitudinal extending portions 44 of the liner extend at least partially in the recess of the fastener, thus forming at least one tube receiving recess 38 in the composite fastener 10 generally conforming to but smaller than the recess 20 in the pin member. It will be noted that the throat dimension D1 of the composite fastener prior to driving should be great enough to accept a tubing 54 therein as the fastener is driven over the tubing. Thus the minimum dimension between the side wall portions of the recess plus the thickness of the transverse section 46 of the liner should be greater than the diameter of an associated tubing. It is also preferable that the length of the longitudinally extending section 44 of the liner be greater than the periphery of the recess 20 to insure the underlying of at least a section of the liner beneath the tubing.

In operation, a plurality of fastener devices 10 may be collated in a face to face arrangement with apertures 32 aligned to facilitate collation. These devices 10 may then successively be fed into the driving chamber of a suitable power driving tool. The tubing 54 to be clamped and fastened is positioned beneath the fastener and located on the support surface in a manner to allow the shank of the device to be closely adjacent to one side of the tubing as shown in FIG. 2. The tubing may be positioned or held slightly spaced from the support surface with an appropriate attachment (not shown) to the driving tool. Upon proper positionment of the tool and fastener over the spaced tubing an impact force is imparted to the upper surface 28 of the device directing the shank downwardly with the point 16 penetrating a support surface. As the pin is so driven, the base portion 42 of the liner abuts the support surface and the liner is driven upwardly along the shank as the pin member progresses through the support surface. Since the liner is channel-shaped, it will track along the surface forming the recess and follow the contour thereof as the device is driven.

Since the original throat dimension D1 is greater than the tubing diameter, the tubing will be received and permitted to nest within the recess 38. Inwardly directed segments of the recess 26 will force the extremity of the liner 40 to curl under the tubing as shown in FIG. 8 thus diminishing the throat of the recess to a dimension D2, which is less than the diameter of the tubing. This final configuration provides a resilient cushion about the tubing and spaces the tubing from the support surface while firmly clamping the tubing thereto.

While certain driving tools may have the capability in and of themselves of determining and controlling the amount of penetration of a fastener, it may be desirable to provide the fastening device with a positive abutment to limit the penetration of the device so the tubing is not crushed during the clamping procedure. Accordingly, abutment shoulders 37 may be provided on the shank at a position intermediate the penetrating point and the throat of the recess. The bight portion 42 of the liner should therefore be located intermediate the shoulder 37 and point 16.

If desired, the pin member may be provided with structure capable of guiding, aligning and stabilizing the device as it is driven through the chamber of the tool. Tabs 30 may be formed on front and rear surfaces 34 and 36 of the pin member for this purpose. Suitable grooves 30a formed in the side surfaces 34a and 36a of the embodiment shown in FIGS. 9 and 10 may alternatively be utilized for such a guiding purpose in cooperation with protuberances formed in the chamber.

In certain situations, the lowermost surface of the leg 24 may provide the stop or abutment surface preventing overdriving of the fastener. It may also be desirable to locate a separate abutment surface 37a on the same axial plane as the extremities 25a as shown in FIG. 9 serving as a multipoint abutment means.

It should also be apparent that the fastener device of the present invention could be designed to fasten a plurality of tubing members with a single fastener or may clamp a single elongated tubing as shown in the embodiment 10b shown in FIG. 11. One extremity 42b of the liner 40b may be mounted intermediate the point of the pin and the recess so that the single tubing clamping device 10b will function substantially identical to the embodiments described above.

Thus it is apparent that there has been provided, in accordance with the invention, a fastening device and method of fastening particularly useful in securing tubing to a support surface without preparing a hole therein that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A fastening device for the attachment of tubing or the like to a support surface, comprising a shank, a head member at one extremity of the shank and a support surface penetrating point at the opposite extremity, the head member including at least one tubing receiving and clamping recess opening toward the penetrating point of the shank, the peripheral surface of the recess defining top and opposing side wall portions, an inner side wall portion disposed adjacent the shank axis and an outer side wall portion spaced outwardly from the shank axis with the lowermost extremities of the side walls defining the mouth of the recess, a flexible recess liner means mounted on the device for juxtaposed relationship with the peripheral surface of the recess, the recess liner, in cooperation with the recess, defining a predetermined mouth opening which is at least as great as the maximum transverse dimension of an associated tubing to permit entry of the tubing into the recess, the head including a bight portion interconnecting a leg portion extending downwardly therefrom, the inner surface of the leg portion forming the outer side wall of the recess, said outer side wall surface including a segment adjacent the lowermost extremity of the leg which is angled toward the shank, the lowermost extremity of the recess linear means being mounted intermediate the penetrating point and the mouth of the recess wherein the liner means is adapted to be forced upwardly on the device to generally follow the contour of the peripheral surface of the recess as the shank is driven into the support surface, the angled segment directing the liner means inwardly toward the shank decreasing the predetermined mouth opening beneath the associated tubing.

2. The device of claim 1, wherein the shank, head and penetrating point comprise a unitary pin member.

3. The fastening device in accordance with claim 2, wherein the flexible liner is a channel shaped thermoplastic strip having a cross-sectional configuration including a transverse portion with legs depending therefrom, transverse portion being a width generally equal to the thickness of the pin member so that the associated side surfaces of the pin member are received in the channel for tracking movement of the liner along the side surfaces responsive to the driving of the pin member into the support surface.

4. A fastening device in accordance with claim 2, wherein the pin member is substantially uniform in thickness from the top of the head to the penetrating point.

5. A fastening device in accordance with claim 2, wherein the pin member includes abutment means to limit the penetration of the pin member in the support surface, the lowermost extremity of the liner means being intermediate the penetrating point and the abutment means.

6. A fastening device in accordance with claim 1, wherein the head includes a pair of coplanar tubing receiving and clamping recesses with the longitudinal axis of the shank being intermediate said pair of recesses.

7. A fastening device in accordance with claim 1, wherein the lower surface of the head defines the recess means and wherein one of the side wall portions of the recess surface is substantially a continuation of a side surface of the shank.

8. A fastening device in accordance with claim 1, wherein the lower surface of the head portion defining the recess is a substantially curvilinear surface extending from a side surface of the shank.

9. A fastening device in accordance with claim 1, wherein a portion of the flexible liner extends upwardly into the recess and is adapted to track around the contour of the recess.

10. A fastening device in accordance with claim 1, wherein the length of the flexible liner is greater than the periphery of the surface forming the recess so that the liner may be forced beneath tubing received in the recess as the shank is driven into the support surface.

11. A fastening device in accordance with claim 2, wherein the head includes two tubing receiving recesses with the shank positioned intermediate thereof, the liner means including a bight portion interconnecting a pair of substantially opposing portions extending upwardly along associated side edges of the shank, the shank extending through the bight portion of the liner preassembling and retaining the liner on the pin member.

12. The fastening device in accordance with claim 2, wherein the pin member is substantially uniform in thickness from one extremity to the other including the head portion, the liner means being a generally channel shaped thermoplastic strip having a cross-sectional configuration with a transverse portion and a pair of legs depending therefrom, the thickness of the pin member being substantially equal to the distance between the legs of the channel shaped strip, guide means formed on opposing faces of the pin member to align and stabilize the fastening device in a plane generally perpendicular to the support surface as the device is driven through the bore of a nosepiece of a driving tool.

13. A fastening device in accordance with claim 12, wherein the guide means consist of tabs extending outwardly from opposing side faces of the pin member.

14. A fastening device in accordance with claim 12, wherein the guide means consist of a longitudinally extending groove formed in opposing side faces of the pin member.

15. A fastener device in accordance with claim 1, including an aperture extending transversely through the head to facilitate collation of the devices and removal of the devices from a support surface after the device has been driven therein.

* * * * *